United States Patent [19]

Andres

[11] 4,127,246
[45] Nov. 28, 1978

[54] PARACHUTE AIR DROP LOAD IMPACT REDUCING SYSTEM

[76] Inventor: James R. Andres, 388 Mecca Dr., Vandalia, Ohio 45377

[21] Appl. No.: 820,279

[22] Filed: Jul. 29, 1977

[51] Int. Cl.$^2$ .......................... B64D 1/14; B64D 17/22
[52] U.S. Cl. .............................................. 244/138 R
[58] Field of Search ............... 244/138 R, 142, 151 B, 244/152; 102/34.1, 35, 4

[56] References Cited

U.S. PATENT DOCUMENTS

| 2,414,284 | 1/1947 | Bacon | 244/138 R |
| 2,560,445 | 7/1951 | Jackson | 244/138 R |
| 2,662,707 | 12/1953 | Vann | 244/138 R |
| 3,113,752 | 12/1963 | Brestel | 244/152 X |

Primary Examiner—Barry L. Kelmachter
Attorney, Agent, or Firm—Joseph E. Rusz; Richard J. Killoren

[57] ABSTRACT

A system for reducing the ground impact of a load in a parachute air drop system having the parachute canopy attached to a first platform and the load attached to a second platform. The first platform and second platform are connected together by a plurality of elastic cords. The elastic cords are held in a relaxed state by a steel cable connected between the platforms. A ground probe supported on a line a predetermined distance below the cargo load has switch contacts which close when the probe reaches the ground to operate a cable cutter. The cable cutter cuts the steel cable connected between the platforms to permit the cargo to free fall under the restraint of the elastic cords. The partially unloaded canopy and the air mass inertia under the canopy is used to slow the cargo load velocity just prior to touch down.

3 Claims, 6 Drawing Figures

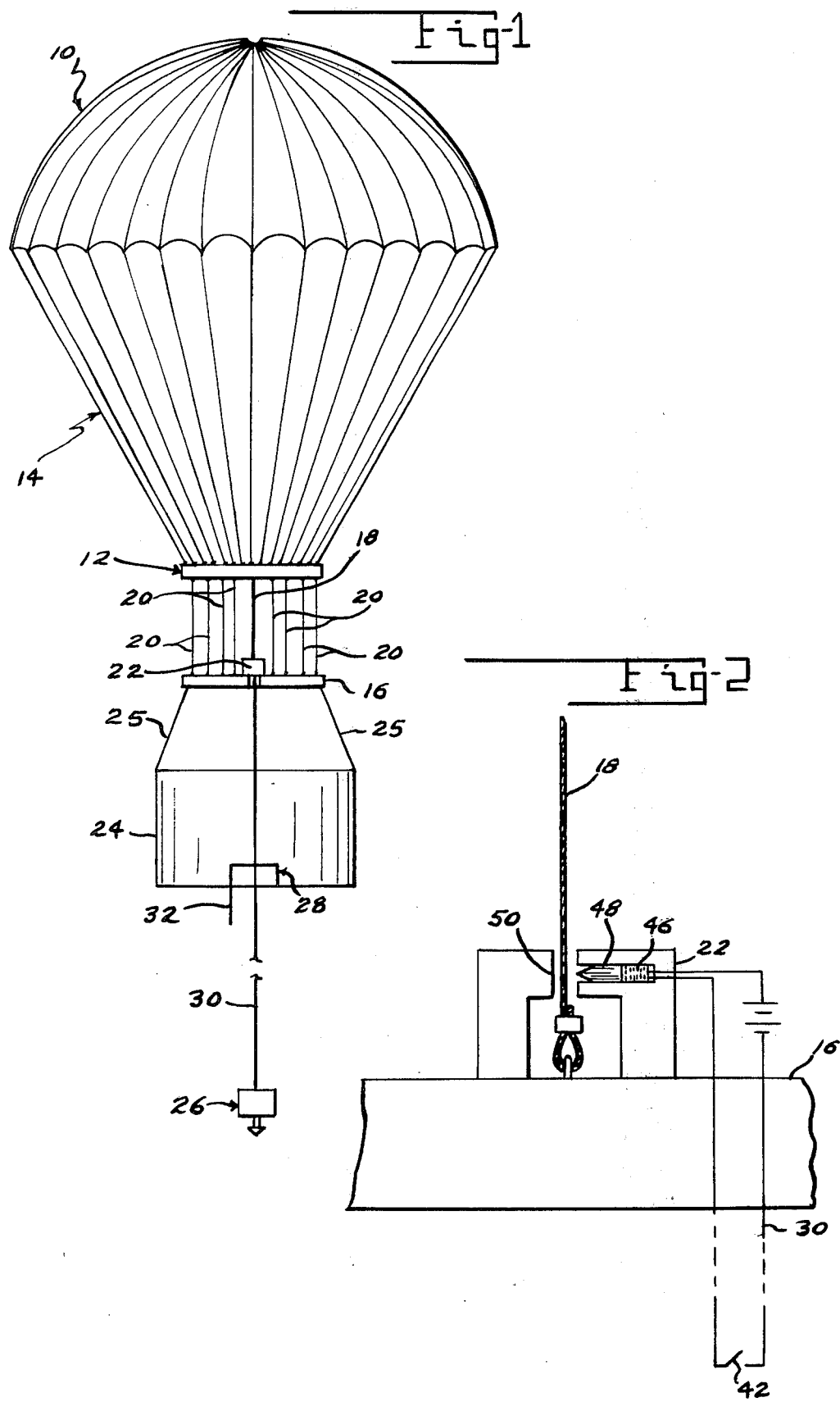

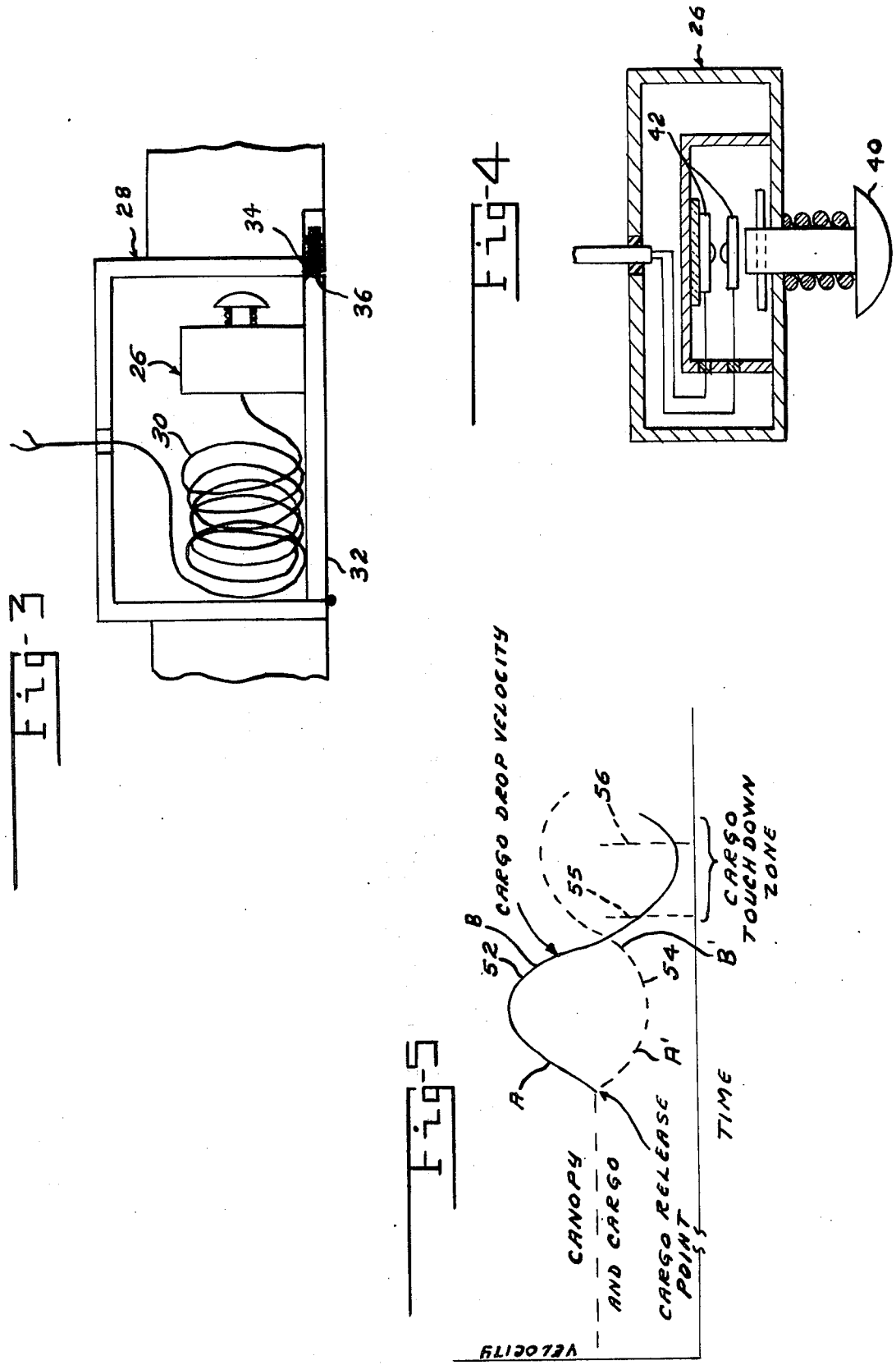

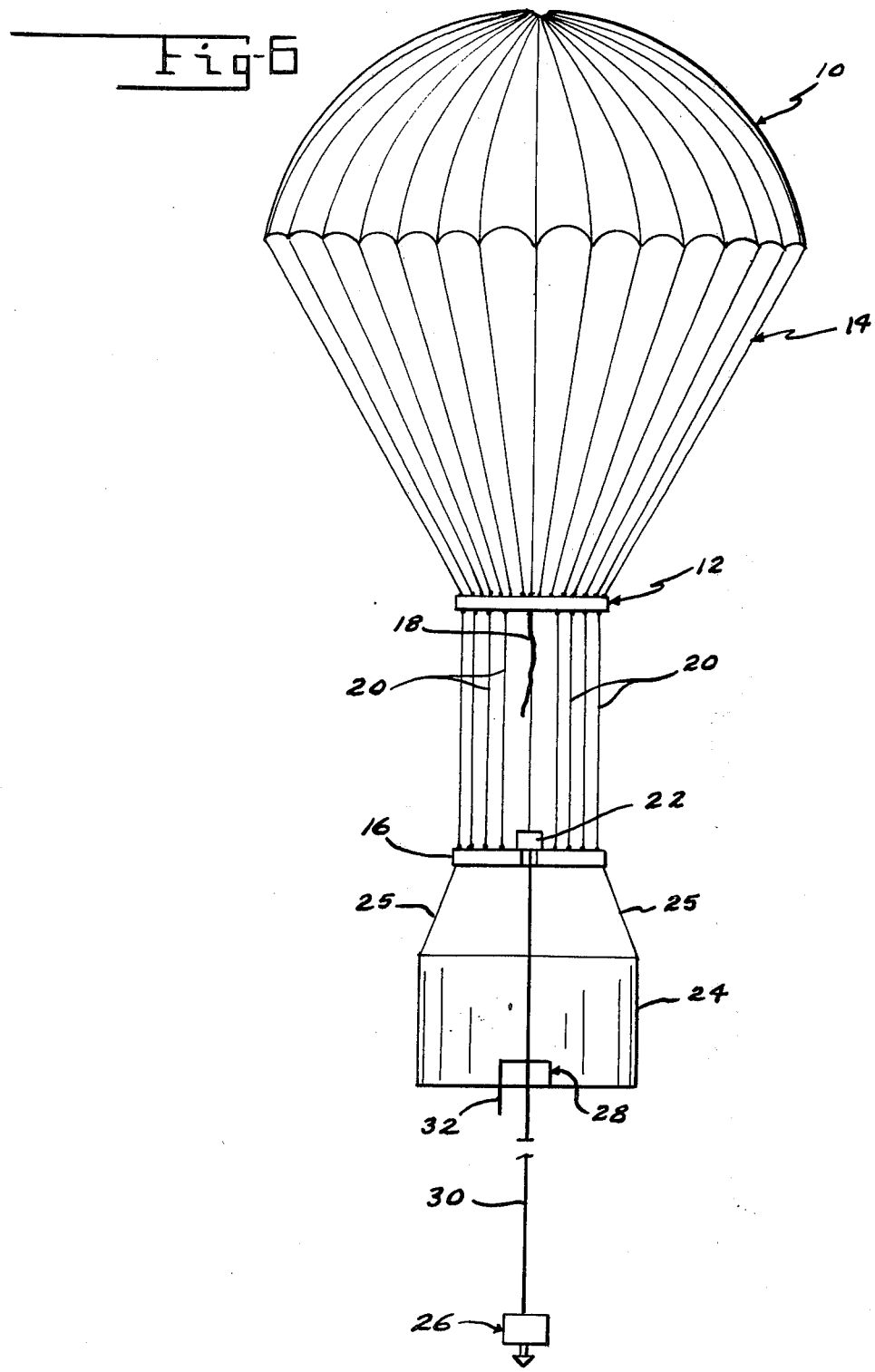

PARACHUTE AIR DROP LOAD IMPACT REDUCING SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to a system for reducing load impact in a parachute air drop system.

Various systems have been used to lessen the impact with the ground of parachute air drop loads. The patent to Hattan, U.S. Pat. No. 2,486,403, describes one such system which makes use of pressure inflation of the parachute to lessen the load impact with the ground. The patent to Vogt, U.S. Pat. No. 2,872,138, uses the vertical thrust of a rocket to lessen load impact with the ground. The patents to Robins, U.S. Pat. No. 2,492,501; Fritz, U.S. Pat. No. 3,109,615; and Barnett et al, U.S. Pat. No. 3,387,805 provide systems for lessening parachute load impact with the ground wherein various devices are used to decrease the distance between the parachute and the load just before impact.

BRIEF SUMMARY OF THE INVENTION

According to this invention, use is made of elastic cords placed between the parachute shroud lines and the cargo which are held in a relaxed state until the load reaches a predetermined distance above the ground. An impact switch hanging a present distance below the load contacts the ground and releases the cargo which permits the cargo load to free fall under the restraint of the elastic cords. The canopy descent slows until the elastic system reaches its maximum extension. At this time the elastic system tends to pull the cargo up and to draw down on the canopy, effectively slowing the cargo load drop velocity by using the air mass inertia under the canopy together with the contraction of the elastic cords.

IN THE DRAWING

FIG. 1 is a schematic diagram of a parachute cargo load impact reducing system according to the invention.

FIG. 2 is a schematic diagram of a cable cutter for the device of FIG. 1.

FIG. 3 is a schematic diagram of a probe and line container for the device of FIG. 1.

FIG. 4 is a partially schematic sectional view of a probe which may be used in the device of FIG. 1.

FIG. 5 is a schematic of a representative curve of the velocity-time relation of the device of FIG. 1 after the cutting of the cable.

FIG. 6 shows the device of FIG. 1 after the cutting of the cable and with the elastic cords extended.

DETAILED DESCRIPTION OF THE INVENTION

Reference is now made to FIG. 1 of the drawing which shows a conventional parachute canopy 10 which is attached to a shroud attachment platform 12 by means of a plurality of shroud lines 14.

The platform 12 is secured to a second platform 16 by means of a steel cable 18 and a plurality of elastic support cords 20, which may for example be made of rubber shock cord made by Thomas Taylor Co. The particular cord used would be determined by the particular parachute cargo load. The cable 18 passes through a conventional cable cutter 22, shown schematically, in greater detail, in FIG. 2. One cable cutter that could be used is a cable cutter part No. 9306101 made by Cartridge Actuated Devices Co. The platforms 12 and 16 need not be solid platforms but may have various configurations; for example, they could be ring members, with plural cables connected to the rings. These cables could be connected to a single cable with a clamp-on cutter being used.

The load, indicated schematically at 24, is secured to platform 16 with conventional load straps or cables, indicated schematically at 25.

A ground probe 26 is stored in a release container 28 along with the electrical connection cord 30, as shown in FIG. 3. The container 28 has a release door 32 held in place by a spring loaded ball latch 34 which engages a notch 36 in the door 32. With the use of a spring loaded door latch, the canopy opening shock will be sufficient to allow the door to open and the ground probe to fall out of the container 28. For some applications it might be desirable to use a time release latch for the door 32. Also the container 28 may not be needed, in some applications, as it may be possible to allow the cord and switch to trail from the drop aircraft without entanglement.

The ground probe 26 may be of conventional design; for example, as shown in FIG. 4, wherein a spring loaded plunger 40 will close switch contacts 42 when the probe reaches the ground. The closing of contacts 42 will ignite the charge 46, shown in FIG. 2, to drive cutter 48 toward the anvil 50 and thereby cut cable 18.

In the operation of the device, when the parachute is deployed, the canopy opening shock will cause the door 32 to open to drop the probe 26 and to extend line 30, as shown in FIG. 1. When the probe 26 engages the ground, contacts 42 are closed to fire the charge 46. This causes the cutter 48 to cut through cable 18 to permit the cargo load 22 and platform 16 to free fall and increases in velocity as indicated by the initial portion A of curve 52 in FIG. 5, under the restraint of elastic cords 20. This will tend to partially unload the parachute canopy allowing it to slow as indicated in portion A' of curve 54 in FIG. 5. As the cargo drops, the elastic cords stretch out and start to restrain the cargo drop velocity against the air mass inertia under the slowed canopy so that the cargo velocity decreases as indicated by portion B of curve 52, as the canopy velocity increases as indicated by portion B' of curve 54. The length of the line 30 should be selected for touch down of cargo in the time between lines 55 and 56 on curve 52. As can be seen this time is a considerable portion of the total period of elastic spring system, so that a large margin of error in selecting the length of line 30 below the cargo is permitted.

There is thus provided a system for reducing load impact in a parachute air drop system which makes use of the air mass inertia under the canopy, together with the contraction of elastic cords, to effectively retard the drop velocity of the cargo before touchdown of the cargo.

I claim:

1. In a parachute cargo load drop system having a parachute canopy with a cargo load supported beneath the parachute, a system for reducing load impact with the ground, comprising: a first platform; a plurality of shroud lines for securing said platform to the parachute canopy; a second platform spaced from said first platform; means for securing the cargo load to said second platform; an elastic support means, connected between said first platform and said second platform for elastically suspending the second platform from said first platform; means, connected between said first platform and said second platform for holding said elastic support means in a relaxed state; a ground sensing probe; means for supporting said ground sensing probe a predetermined distance below said cargo load; means, responsive to said ground sensing probe, for releasing said holding means when the cargo load is a predetermined distance from the ground to thereby permit the cargo load to free fall under the restraint of the elastic support means; said elastic support means including a plurality of elastic cords connected between the first platform and the second platform; said means for holding said elastic support means in a relaxed state including a steel cable connected between said first platform and said second platform; said means for releasing the holding means being a cable cutter adapted to cut said steel cable in response to a signal from said ground sensing probe.

2. The device as recited in claim 1 including a container secured to said load; said container being adapted to hold said ground sensing probe and the means for holding the probe a predetermined distance below the second platform; said container including a releasable door; a spring loaded latch for holding said door in its closed position.

3. The method for reducing the load impact with the ground in a parachute air drop system comprising: securing a parachute canopy to a first platform; securing a cargo load to a second platform; connecting the first platform to the second platform with a plurality of elastic cords; connecting a steel cable, shorter than the elastic cords between the first and second platforms to hold the elastic cords in a relaxed state; connecting a ground sensing probe to said load with a predetermined length of cord whereby the probe will contact the ground a predetermined time before the load; cutting the steel cable in response to said probe to permit the load to free fall under the restraint of said elastic cords thus permitting the parachute canopy to decelerate whereby the cargo drop velocity is restrained against the air mass inertia under the slowed canopy to permit cargo load touchdown at a velocity less than the parachute canopy velocity at the time of touchdown.

* * * * *